Jan. 9, 1951   F. W. WANZENBERG   2,537,322
TENSILE GRIP
Filed March 13, 1947
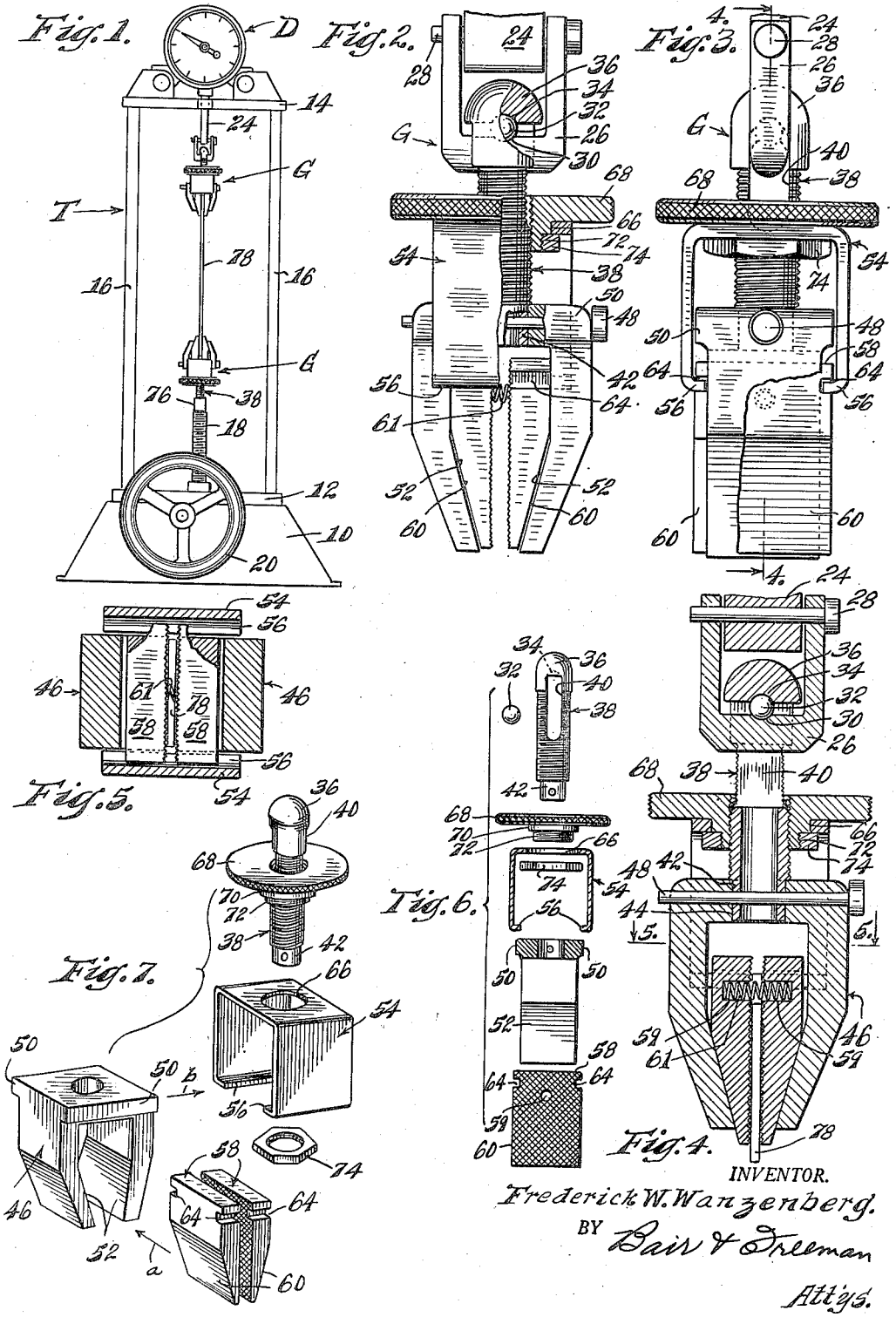
INVENTOR.
Frederick W. Wanzenberg.
BY Bair & Freeman
Att'ys.

Patented Jan. 9, 1951

2,537,322

UNITED STATES PATENT OFFICE 2,537,322

TENSILE GRIP

Frederick W. Wanzenberg, Evanston, Ill., assignor to W. C. Dillon & Company, Inc., Chicago, Ill., a corporation of Illinois Application March 13, 1947, Serial No. 734,522

4 Claims. (Cl. 24—263)

My invention relates to grips for tensile testing and for tests of any kind where a good mechanical hold is desired between the grip and a specimen or the like being tested.

One object of the invention is to provide a grip structure that is comparatively simple in construction and of light weight yet which is so designed that it effectively grips a specimen so as to apply a heavy tensile load thereto without the necessity of the grip being excessively large.

Another object is to provide grips that can be made small due to the design of a pair of jaws that are supported by a lifting member and are movable toward each other under the action of a clamping head, the grip including an adjusting means for moving the head in one direction which results in tapered faces thereof coacting with similar tapered faces of the gripping jaws to move the jaws against the specimen, with an increase in pull of the specimen on the jaws resulting in the jaws gripping the specimen more tightly.

Still another object is to provide a grip for tensile testers and the like.

A further object is to provide an arrangement in which a shank supports a lifting member which in turn supports the gripping jaws, the clamp being movable with respect to the lifting member to effect movement of the jaws toward each other by means of a clamp nut threaded on the shank and operable to move the shank in a clamp applying direction.

With these and other objects in view, my invention consists in the construction, arrangement and combination of the various parts of my grips whereby the objects contemplated are attained, as hereinafter more fully set forth, pointed out in my claims and illustrated in the accompanying drawings wherein:

Figure 1 is a front elevation of a tensile tester showing two of my tensile grips associated therewith for testing a specimen under tension.

Figure 2 is a full size elevation of one of the grips, the grips being similar with the exception of the means for connecting them to the operating mechanism of the tensile tester.

Figure 3 is an elevation at right angles to Figure 2.

Figure 4 is a sectional view on the line 4—4 of Figure 3 showing the jaws closed instead of open as in Figures 2 and 3.

Figure 5 is a sectional view on the line 5—5 of Figure 4.

Figure 6 is an exploded side elevation partly in section showing the parts of the tensile grip, and Figure 7 is an exploded perspective view showing the parts thereof.

On the accompanying drawings I have used the reference character T to indicate in general a tensile tester. The tester T may include a base 10, lower and upper platens 12 and 14 connected by uprights 16, and a loading screw 18. The loading screw is moved vertically by means of a hand wheel 20 through suitable step down gearing and a nut but since these parts form no part of this invention they are not disclosed in detail.

On the platen 14 an indicator such a dynamometer D is mounted and it has a vertically movable rod 24 which, when a load is applied to it for moving it downwardly, will indicate the pull. My tensile grips indicated in general at G are connected with the loading screw 18 and the pull rod 24.

The upper grip G will first be described. It comprises a shank supporting yoke 26 pinned to the pull rod 24 by means of a pin 28. The yoke 26 has in its cross member a seat 30 for a ball 32. The ball 32 coacts with a seat 34 in the head 36 of a shank 38. The shank 38 has a slot 40 therethrough to receive the cross piece of the yoke 26.

The shank 38 is threaded below the yoke 26 and terminates in a reduced extension 42. The shank is hollow as disclosed in Figure 4 and the reduced end 42 is received in a hole 44 of an inverted U-shaped clamp head 46. The clamp head is secured to the shank 38 by means of a pin 48.

The clamp head 46 has a pair of beads 50 which extend beyond the sides of the depending arms of the clamp head which arms are provided with downwardly converging faces 52. A channel shaped lifting member 54 is provided with inturned terminal flanges 56, the distance between which is slightly greater than the width of the faces 52, as shown in Figure 3.

A pair of jaws 58 are provided having faces 60 tapered at the same slant as the faces 52. Each jaw 58 is provided at each of its sides with a notch 64. The jaws are adapted to be slid into the clamp head 46 in the direction of the arrow $a$ (Figure 7) after which the clamp head and the jaws are adapted for sliding into the lifting member 54 in the direction of the arrow $b$, the flanges 56 receiving the notches 64.

The top of the lifting member 54 is provided with an opening 66. A clamp nut 68 of large knurled disc-like shape is provided having a shoulder 70 to rotate in the opening 66. Below the shoulder 70, the nut 68 is threaded at 72 to receive a lift nut 74.

Returning to Figure 7, the further assembly of the tensile grip involves the movement of the shank 38 downwardly through the opening 66, the positioning of the lift nut 74 on the shank, the pinning of the clamp head 46 to the hank and the tightening of the lift nut against the shoulder 70 to produce the finished assembly shown in Figures 2, 3 and 4.

The jaws 58 are provided with sockets 59 in which a spring 61 is mounted for the purpose of normally forcing the jaws apart.

In place of the yoke 26, ball 32, ball seats 30 and 34 and head 36 for the upper grip, the lower grip (see Figure 1) has merely the threaded shank 38 extending downwardly therefrom, this grip of course being inverted relative to the upper grip. The shank 38 is then threaded into a coupling 76 which also receives a reduced threaded upper end of the loading screw 18.

*Practical operation*

In the operation of my tensile grip the jaws 58 may be opened to the maximum extent by moving the shank 38 and thereby the clamp head 46 downwardly into the position of Figures 2 and 3. This is done by rotating the clamp nut 68 counter-clockwise (viewed from above). A specimen such as a bar 78 may be placed between the jaws 58 and the clamp nut 68 then rotated clockwise. This will raise the shank in relation to the lifting member 54 and in relation to the jaws themselves as they are held against such raising movement by the flanges 56 of the lifting member in the notches 64 of the jaws. These notches permit the jaws to move toward each other however and such movement is accomplished by the inclined faces 52 moving upwardly relative to the companion faces 60.

The nut 68 may be rotated clockwise the necessary amount to firmly grip the specimen and thereafter pull may be applied to the grip and the specimen. Such pull tends to also pull the jaws more tightly against the specimen because (referring to Figure 4) the tendency of the specimen is to pull the jaws downwardly along the converging inclined surfaces of the clamp head. The jaws of course may be serrated for a better grip on the specimen and instead of flat may be concave if round specimens are to be gripped.

As pull is applied by lowering the loading screw 18, the lift nut 74 supports the lifting member 54 and it in turn supports the jaws 74 through the flanges 56 and notches 64. A construction of this character in the size shown weighs about one pound and permits pulls in excess of two-hundred-fifty pounds when the parts are made of ordinary steel. Even higher pull is possible where the parts are made of some special high tensile types of steel.

After the specimen has been tested and ruptured it may be easily removed by rotating the clamp nut 68 counter-clockwise so that the clamping head 46 can be lowered to permit the jaws to open. Thus I provide for positive disengagement of the clamp head from the jaws so that the jaws can be readily disengaged from the specimen.

During the testing operations the ball 32 permits for proper alignment in case the specimen is not truly straight or is gripped in the jaws at a slight angle. Thus a true tensile test on the specimen is made possible.

The lower grip need not be mounted for universal movement as it can always be clamped on the specimen first so that the specimen can be approximately aligned with the upper grip and then when the upper grip is clamped and pull is applied the ball 32 permits the parts to align properly.

While I have shown a relatively small grip it of course can be larger size for heavier work. In the size shown however it is comparatively light weight for its strength and therefore desirable in connection with low capacity testing. The design is such that the operating mechanism is not in the way of placing the specimen but well beyond the end of the specimen thus facilitating testing operations.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a tensile grip of the character disclosed, a shank, a lifting member to be supported thereby, said lifting member having inturned flanges, jaws slidably mounted on said flanges, an inverted U-shaped clamp head having downwardly converging faces directed toward each other, said jaws having similar faces fitting the faces of said clamp head, said shank being secured to said clamp head, and a clamp nut rotatable on said shank for moving it longitudinally and rotatably and non-slidably mounted with respect to said lifting member.

2. A tensile grip comprising a shank, a lifting member to be supported thereby, said lifting member having supporting flanges, jaws slidably mounted thereon, a clamp head having downwardly converging faces directed toward each other, said jaws having similar faces slidably fitting the faces of said clamp head, said shank being secured to said clamp head, and a clamp nut threaded on said shank and rotatable on said lifting member.

3. A tensile grip comprising a threaded load-bearing shank, a lifting member fixedly secured to the shank and defining downwardly converging jaw-receiving faces, jaws having conformations mating with and received by said faces of the lifting member for gripping or releasing engagement as they move in relation to the lifting member, the jaws having notches at their upper portions, a clamp nut threadedly received by the shank, and a member rotatably secured to the clamp nut and having depending portions with inwardly extending terminal flanges received in the notches of the jaws.

4. A tensile grip comprising in combination a threaded load-bearing shank, a lifting member secured to the lower end of the shank and defining a pair of complementary downwardly converging jaw-receiving faces, a pair of jaws having conformations mating with and received by said faces of the lifting member for gripping or releasing engagement as they move in relation to the lifting member, the jaws having notches oriented laterally of the aforesaid conformations, a clamp nut threadedly received by the shank, and a member rotatably secured to the clamp nut and having depending complementary portions with inwardly extending terminal flanges received in the notches of the jaws.

FREDERICK W. WANZENBERG.

(References on following page)

REFERENCES CITED

The following references are of record in the file of this patent:

UNITED STATES PATENTS

| Number | Name | Date |
|---|---|---|
| 58,306 | Sedgwick | Sept. 25, 1866 |
| 531,715 | Brown | Jan. 1, 1895 |
| 1,496,803 | Amsler | June 10, 1924 |
| 1,655,734 | McWilliams | Jan. 10, 1928 |
| 1,674,223 | Rabut | June 19, 1928 |
| 1,930,022 | Tautz | Oct. 10, 1933 |
| 1,935,645 | Lundin | Nov. 21, 1933 |
| 2,419,711 | Dillon | Apr. 29, 1947 |

FOREIGN PATENTS

| Number | Country | Date |
|---|---|---|
| 10,506 | Great Britain | May 30, 1894 |